(12) United States Patent
Matsunaga et al.

(10) Patent No.: US 8,193,753 B2
(45) Date of Patent: Jun. 5, 2012

(54) MOTOR CONTROLLER AND ELECTRIC POWER TOOL HAVING THE SAME

(75) Inventors: Takashi Matsunaga, Anjo (JP); Hirokatsu Yamamoto, Anjo (JP); Takuya Kusakawa, Anjo (JP)

(73) Assignee: Makita Corporation, Anjo-Shi (JP)

( * ) Notice: Subject to any disclaimer, the term of this patent is extended or adjusted under 35 U.S.C. 154(b) by 353 days.

(21) Appl. No.: 12/450,186

(22) PCT Filed: Feb. 22, 2008

(86) PCT No.: PCT/JP2008/053038
§ 371 (c)(1),
(2), (4) Date: Sep. 15, 2009

(87) PCT Pub. No.: WO2008/129899
PCT Pub. Date: Oct. 30, 2008

(65) Prior Publication Data
US 2010/0027979 A1    Feb. 4, 2010

(30) Foreign Application Priority Data

Apr. 13, 2007    (JP) ................................. 2007-105801

(51) Int. Cl.
     *G05B 11/28*    (2006.01)
(52) U.S. Cl. ........................................ 318/599; 318/811
(58) Field of Classification Search .................. 318/572, 318/599, 400.01, 811, 804, 819, 827, 721, 318/799, 779, 801, 701; 388/907.5, 937; 483/7, 16; 83/72
See application file for complete search history.

(56) References Cited

U.S. PATENT DOCUMENTS
4,905,135 A    2/1990    Unehara et al.
(Continued)

FOREIGN PATENT DOCUMENTS
EP    0 464 644 A1    1/1992
(Continued)

OTHER PUBLICATIONS

New U.S. Patent Application filed Sep. 15, 2009, in the name of Matsunaga et al.
(Continued)

*Primary Examiner* — Walter Benson
*Assistant Examiner* — Antony M Paul
(74) *Attorney, Agent, or Firm* — Oliff & Berridge, PLC

(57) ABSTRACT

A motor controller is provided with a velocity processing unit that determines a corrected target rotation velocity by correcting the inputted target rotation velocity of the motor in accordance with a velocity deviation between the inputted target rotation velocity and an actual rotation velocity detected from the motor, a first PWM circuit that repeatedly outputs an on-signal having a first pulse width at a first carrier frequency, wherein the first pulse width of the on-signal is modulated by the first PWM circuit in accordance with the corrected target rotation velocity, a second PWM circuit that repeatedly outputs an on-signal having a second pulse width at a second carrier frequency, wherein the second pulse width is different from the first pulse width, the second carrier frequency is lower than the first carrier frequency, and the second pulse width of the on-signal is modulated by the second PWM circuit in accordance with the corrected target rotation velocity, an AND circuit that receives the on-signal outputted from the first PWM circuit and the on-signal outputted from the second PWM circuit and outputs third on-signal which is a logical product of the on-signals, and a voltage apply circuit that applies voltage to the motor intermittently in synchronization with the third on-signal outputted from the AND circuit. As a result, the rotation velocity of the motor may be correctly controlled.

6 Claims, 6 Drawing Sheets

U.S. PATENT DOCUMENTS

| | | | |
|---|---|---|---|
| 5,031,088 A * | 7/1991 | Tanaka | 363/71 |
| 5,300,866 A * | 4/1994 | Yasohara et al. | 318/400.21 |
| 5,339,013 A | 8/1994 | Nakai et al. | |
| 7,119,508 B2 * | 10/2006 | Kurosawa et al. | 318/400.04 |
| 2002/0005706 A1 | 1/2002 | Oku | |
| 2002/0071295 A1 | 6/2002 | Nishikawa | |
| 2004/0217727 A1 | 11/2004 | Gilmore | |
| 2009/0096402 A1 * | 4/2009 | Miyajima et al. | 318/473 |
| 2009/0115362 A1 | 5/2009 | Saha et al. | |

FOREIGN PATENT DOCUMENTS

| | | |
|---|---|---|
| JP | A-63-073898 | 4/1988 |
| JP | 64-060280 | 3/1989 |
| JP | U-03-011397 | 2/1991 |
| JP | A-06-043904 | 2/1994 |
| JP | A-2002-084774 | 3/2002 |
| JP | A-2002-153082 | 5/2002 |
| JP | A-2005-150873 | 6/2005 |
| JP | A-2005-169535 | 6/2005 |
| JP | A-2007-060869 | 3/2007 |

OTHER PUBLICATIONS

Feb. 9, 2012 European Search Report in Appln. No. 08711812.1.
Jan. 11, 2012 European Search Report issued in European Patent Application No. EP 08711811.3.
Feb. 21, 2012 Notification of Reasons for Rejection issued in Japanese Patent Application No. 2007-105801 (with translation).
Feb. 21, 2012 Notification of Reasons for Rejection issued in Japanese Patent Application No. 2007-105800.
Feb. 22, 2012 Non-Final Office Action issued in U.S. Appl. No. 12/450,187.

* cited by examiner

MOTOR CONTROLLER AND ELECTRIC POWER TOOL HAVING THE SAME

CROSS-REFERENCE TO RELATED APPLICATION

This application claims priority to Japanese Patent Application No. 2007-105801, filed on Apr. 13, 2007, the contents of which are hereby incorporated by reference into the present application.

BACKGROUND OF THE INVENTION

1. Field of the Invention

The present invention relates to a motor controller. More particularly, the present invention relates to a motor controller that adjusts the rotation velocity of a motor to a target rotation velocity.

2. Description of the Related Art

A Patent Document 1 cited below discloses a brushless motor controller. The controller comprises a first PWM (Pulse Width Modulation) circuit, a second PWM circuit and an AND circuit. The first PWM circuit repeatedly outputs an on-signal having a first pulse width at a first carrier frequency, with the first pulse width of the on-signal being modulated by the first PWM circuit in accordance with the target rotation velocity. The second PWM circuit repeatedly outputs an on-signal having a second pulse width at a second carrier frequency, with the second pulse width being different from the first pulse width, the second carrier frequency being lower than the first carrier frequency, and the second pulse width of the on-signal being modulated by the second PWM circuit in accordance with the target rotation velocity. The AND circuit receives both the on-signal outputted from the first PWM circuit and the on-signal outputted from the second PWM circuit and outputs a third on-signal which is a logical product of the received on-signals. The rotation velocity of the motor is adjusted to a target rotation velocity by intermittently applying a voltage to the motor in accordance with the on-signal outputted by the AND circuit.

In the controller having two PWM circuits, as in the controller disclosed in the Patent Document 1, a duty ratio of the on-signal outputted by the AND circuit (duty ratio is a ratio of a period during which the on-signal is outputted with respect to a total period) is made to vary by causing the pulse widths of the on-signals outputted by the two PWM circuits to vary respectively. In the controller of the Patent Document 1, for instance, when a detected actual rotation velocity of the motor is less than a predetermined threshold velocity, the pulse width (first pulse width) of the on-signal outputted by the first PWM circuit is fixed to a predetermined width, while the pulse width (second pulse width) of the on-signal outputted by the second PWM circuit is caused to vary. In this case, the AND circuit outputs intermittently the on-signal outputted by the first PWM circuit in synchronization with the on-signal outputted by the second PWM circuit. It becomes possible as a result to further reduce the duty ratio of the on-signal outputted by the AND circuit, with the pulse width of the on-signal outputted by the AND circuit fixed to a predetermined width.

Patent Document 1: Japanese Utility Model Application Publication No.H03-011397

DISCLOSURE OF THE INVENTION

Problem to be Solved by the Invention

In the controller disclosed in the Patent Document 1, when the detected actual rotation velocity of the motor is less than the threshold velocity, the pulse width (first pulse width) of the on-signal outputted by the first PWM circuit is fixed to the predetermined width, regardless of the target rotation velocity of the motor. If the actual rotation velocity of the motor is less than the threshold velocity, therefore, the pulse width of the on-signal is fixed to the predetermined width, no matter how high the setting of the target rotation velocity may be. When the motor is controlled for instance at a comparatively high target rotation velocity, the actual rotation velocity of the motor may drop below the threshold velocity as a result of a large load torque acting on the motor. In this case, the pulse width (first pulse width) of the on-signal is fixed to the predetermined width in the controller disclosed in the Patent Document 1. As a result, the power supplied to the motor is restricted to an unnecessary extent, which may cause the rotation velocity of the motor to drop further. In the controller disclosed in the Patent Document 1, the rotation velocity of the motor may fail to be correctly adjusted to an inputted target rotation velocity.

In the light of the above problem, the present teachings provide a technology that allows a motor controller using two PWM circuits to correctly control the rotation velocity of a motor to be at an inputted target rotation velocity.

Means to Solve the Problem

The present teachings allow realizing a motor controller that adjusts the rotation velocity of a motor to be at a target rotation velocity. The motor controller comprises a velocity processing unit, a first PWM circuit, a second PWM circuit, an AND circuit, and a voltage apply circuit. The velocity processing unit determines a corrected target rotation velocity by correcting the inputted target rotation velocity of the motor in accordance with a velocity deviation between the inputted target rotation velocity and an actual rotation velocity detected from the motor. The first PWM circuit repeatedly outputs an on-signal having a first pulse width at a first carrier frequency. The first pulse width of the on-signal is modulated by the first PWM circuit in accordance with the corrected target rotation velocity. The second PWM circuit repeatedly outputs an on-signal having a second pulse width at a second carrier frequency. The second pulse width is different from the first pulse width, the second carrier frequency is lower than the first carrier frequency, and the second pulse width of the on-signal is modulated by the second PWM circuit in accordance with the corrected target rotation velocity. The AND circuit receives the on-signal outputted from the first PWM circuit and the on-signal outputted from the second PWM circuit, and outputs a third on-signal which is a logical product of the on-signals. The voltage apply circuit applies a voltage to the motor intermittently in synchronization with the third on-signal outputted from the AND circuit.

The controller corrects the inputted target rotation velocity of the motor in accordance with the velocity deviation between the inputted target rotation velocity and the actual rotation velocity detected from the motor. The controller determines the pulse widths of the respective on-signals outputted by the two PWM circuits on the basis of the target rotation velocity after correction. As a result, the pulse widths of the on-signals of the PWM circuits can be appropriately determined on the basis of both the target rotation velocity and the actual rotation velocity. For instance, when the actual rotation velocity of the motor substantially drops upon application of a load torque, the rotation velocity of the motor can be raised up to the target rotation velocity by quickly increasing the power supplied to the motor.

The controller can correctly control the rotation velocity of the motor to be at the inputted target rotation velocity, without unnecessarily restricting the power supplied to the motor.

In the above controller, preferably, the velocity processing unit determines the corrected target rotation velocity in accordance with the actual rotation velocity detected during a period in which the second PWM circuit does not output the on-signal.

The period in which the second PWM circuit does not output the on-signal is a period during which the AND circuit outputs no on-signal, and is also a period in which supply of power to the motor is discontinued. In periods in which power supply to the motor is discontinued, the rotation velocity of the motor drops readily, and the motor may stop if a large load torque acts on the motor. Herein, the rotation velocity of the motor can be prevented from dropping excessively by detecting the actual rotation velocity of the motor during the period in which the second PWM circuit does not output the on-signal, and by determining the corrected target rotation velocity in accordance with the detected actual rotation velocity.

In the above controller, preferably, the velocity processing unit determines the corrected target rotation velocity in accordance with the actual rotation velocity detected at a timing synchronized with the second carrier frequency.

Power is supplied to the motor during the period in which the second PWM circuit outputs the on-signal, while power is not supplied to the motor during the period in which the second PWM circuit does not output the on-signal. As a result, the rotation velocity of the motor is likely to pulsate in synchronization with the on-signal outputted by the second PWM circuit, i.e. in synchronization with the carrier frequency (second carrier frequency) of the second PWM circuit. The detection errors that give rise to pulsation in the rotation velocity of the motor can be eliminated herein by detecting the actual rotation velocity at the timing synchronized with the second carrier frequency. Utilization of the actual rotation velocity thus detected allows correcting the target rotation velocity properly, without receiving excessive influence from pulsation in the rotation velocity of the motor.

In the above controller, preferably, the velocity processing unit changes an amount of correction to be made on the target rotation velocity with respect to the velocity deviation based on the corrected target rotation velocity that has been determined previously.

The pulse widths of the on-signals outputted by the PWM circuits is determined in accordance with the corrected target rotation velocity previously determined by the velocity processing unit. Therefore, changing the amount of correction to be made on the target rotation velocity with respect to the velocity deviation based on the corrected target rotation velocity that has been determined previously is equivalent to changing the amount of correction to be made to the target rotation velocity with respect to the velocity deviation based on the pulse width of the on-signals outputted by the PWM circuits. The controller can increase the amount of correction to be made to the target rotation velocity with respect to the velocity deviation when, for instance, the pulse width (second pulse width) of the on-signal outputted by the second PWM circuit is small.

In the above controller, preferably, the second PWM circuit outputs intermittently the on-signal in which the first pulse width is in proportion to the corrected target rotation velocity when the corrected target rotation velocity is less than a predetermined velocity, and outputs continuously the on-signal when the corrected target rotation velocity is equal to or higher than the predetermined velocity. In this case, preferably, the velocity processing unit increases the amount of correction to be made to the target rotation velocity with respect to the velocity deviation when the corrected target rotation velocity that has been determined previously is less than the predetermined velocity, and decreases the amount of correction to be made to the target rotation velocity with respect to the velocity deviation when the corrected target rotation velocity that has been determined previously is equal to or higher than the predetermined velocity.

In this controller, when the corrected target rotation velocity is less than a predetermined velocity, the second PWM circuit outputs the on-signal intermittently and the power supplied to motor is thereby restricted. During the period in which the second PWM circuit outputs no on-signal, the power supplied to the motor is comparatively discontinued, and hence the rotation velocity of the motor drops readily. The motor may stop if a large load torque acts on the motor. Herein, the rotation velocity of the motor can be prevented from dropping excessively by increasing the amount correction to be made to the target rotation velocity with respect to the velocity deviation.

Effect of the Invention

The present teachings allow a motor controller using two PWM circuits to correctly control the power supplied to the motor and to appropriately control the rotation velocity of the motor to be at the inputted target rotation velocity. In particular, the rotation velocity of the motor can be returned quickly to the inputted target rotation velocity even in case of a substantial drop in the rotation velocity of the motor being caused by a large load torque acting on the motor.

DESCRIPTION OF THE REFERENCE NUMBERS

| | | |
|---|---|---|
| 10: Electric Driver, | 12: Main Body | 14: Barrel Portion |
| 16: Grip | 22: Tool Chuck | 30: Control Board |
| 32: Motor | 50: Battery Pack | |
| 102: Velocity Command Unit | 104: Microcomputer | |
| 106: Velocity Processing Unit | 110: First PWM Circuit | |
| 112: First Oscillation Unit | 114: First Duty Ratio Setting Unit | |
| 116: First On-signal Generating Unit | 120: Second PWM Circuit | |
| 122: Second Oscillation Unit | 124: Second Duty Ratio Setting Unit | |
| 126: Second On-signal Generating Unit | 130: AND Circuit | |
| 132: Driver Circuit | 134: Voltage Apply Circuit | |

DETAILED DESCRIPTION OF THE INVENTION

Preferred Features of Embodiments of the Invention

Some of the features of the embodiments disclosed herein are listed below.
(Feature 1) When the target rotation velocity is less than the threshold velocity, the first PWM circuit may keep the pulse width (first pulse width) of the outputted on-signal at constant. When the target rotation velocity is equal to or higher than the threshold velocity, the first PWM circuit may vary the pulse width of the outputted on-signal in accordance with the target rotation velocity.
(Feature 2) When the target rotation velocity is less than the threshold velocity, the second PWM circuit may vary the pulse width (second pulse width) of the outputted on-signal in accordance with the target rotation velocity. When the target rotation velocity is equal to or higher than the threshold velocity, the second PWM circuit may keep the pulse width of the outputted on-signal at constant (e.g., at 100%: the on-signal being outputted at all times).
(Feature 3) The motor controller may comprise a velocity command unit configured to set a target rotation velocity of the motor.
(Feature 4) The motor controller may comprise a velocity processing unit configured to correct the target rotation velocity set by the velocity command unit in accordance with a difference between the target rotation velocity and the actual rotation velocity of the motor. The first pulse width of the first PWM circuit and the second pulse width of the second PWM circuit may be set in accordance with the corrected target rotation velocity after correction by the velocity processing means.
(Feature 5) The carrier frequency of the first PWM circuit may be equal to or higher than 3 kHz and the carrier frequency of the second PWM circuit may be equal to or lower than 1 kHz.

EMBODIMENT OF THE INVENTION

An electric screwdriver 10 embodying the present teachings will be explained below with reference to accompanying drawings. The electric screwdriver 10 is one kind of an electric power tool used for fastening screws. The electric screwdriver 10 of the present embodiment is an impact-type screwdriver (electric impact screwdriver).

Figure 1:
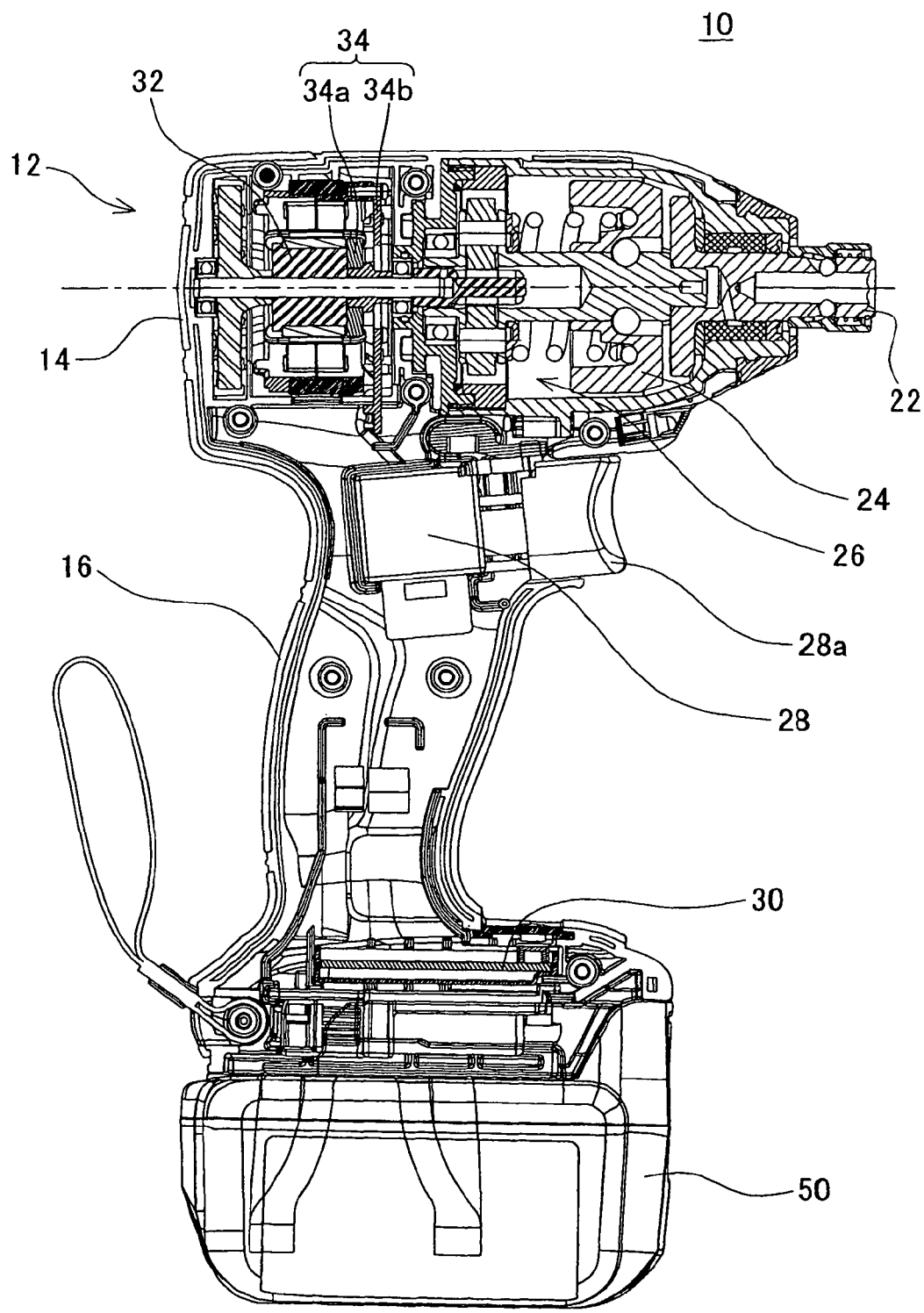
FIG. 1 is a cross sectional side-view of an electric driver.

FIG. 1 is a cross-sectional side-view illustrating the configuration of the electric screwdriver 10. As illustrated in FIG. 1, the electric screwdriver 10 comprises a main body 12 and a battery pack 50 removably attached to the main body 12. Schematically, the main body 12 comprises a substantially solid-cylindrical barrel portion 14 and a grip 16 extending from one side of the barrel portion 14. The battery pack 50 is mounted at the end of the grip 16.

The barrel portion 14 of the main body 12 has built thereinto a tool chuck 22 rotatably supported, an impact mechanism 24 connected to the tool chuck 22, a reducer 26 connected to the impact mechanism 24, and a motor 32 connected to the reducer 26. A driver bit (not shown) can be attached to and removed from the tool chuck 22, which protrudes beyond one end of the barrel portion 14 (on the right side in FIG. 1). The motor 32 is connected, via the reducer 26 and the impact mechanism 24, to the tool chuck 22, into which the driver bit is mounted. The motor 32 rotates this tool chuck 22. The rotation torque of the motor 32 is amplified by the reducer 26. The motor 32 is a three-phase motor.

A position sensor 34 that detects the rotational position (rotational angle) of the motor 32 is provided in the barrel portion 14 of the main body 12. The position sensor 34 comprises a magnet 34a fixed to the rotor of the motor 32 and a sensor board 34b that detects the position of the magnet 34a.

In the grip 16 of the main body 12 a trigger switch 28 for user operation, and a control board 30 that controls the operation of the motor 32 in accordance with the operation of the trigger switch 28 are provided. The trigger switch 28 is an operation section for starting/stopping the motor 32 as well as being an operation section for regulating the rotation velocity of the motor 32. The motor 32 starts rotating when the user operates a trigger member 28a of the trigger switch 28. The motor 32 stops rotating when the user releases the trigger member 28a. When the user operates the trigger member 28a with a greater force, the motor 32 rotates at high velocity. When the user operates the trigger member 28a moderately with less force, the motor 32 rotates at a low velocity.

Figure 2:
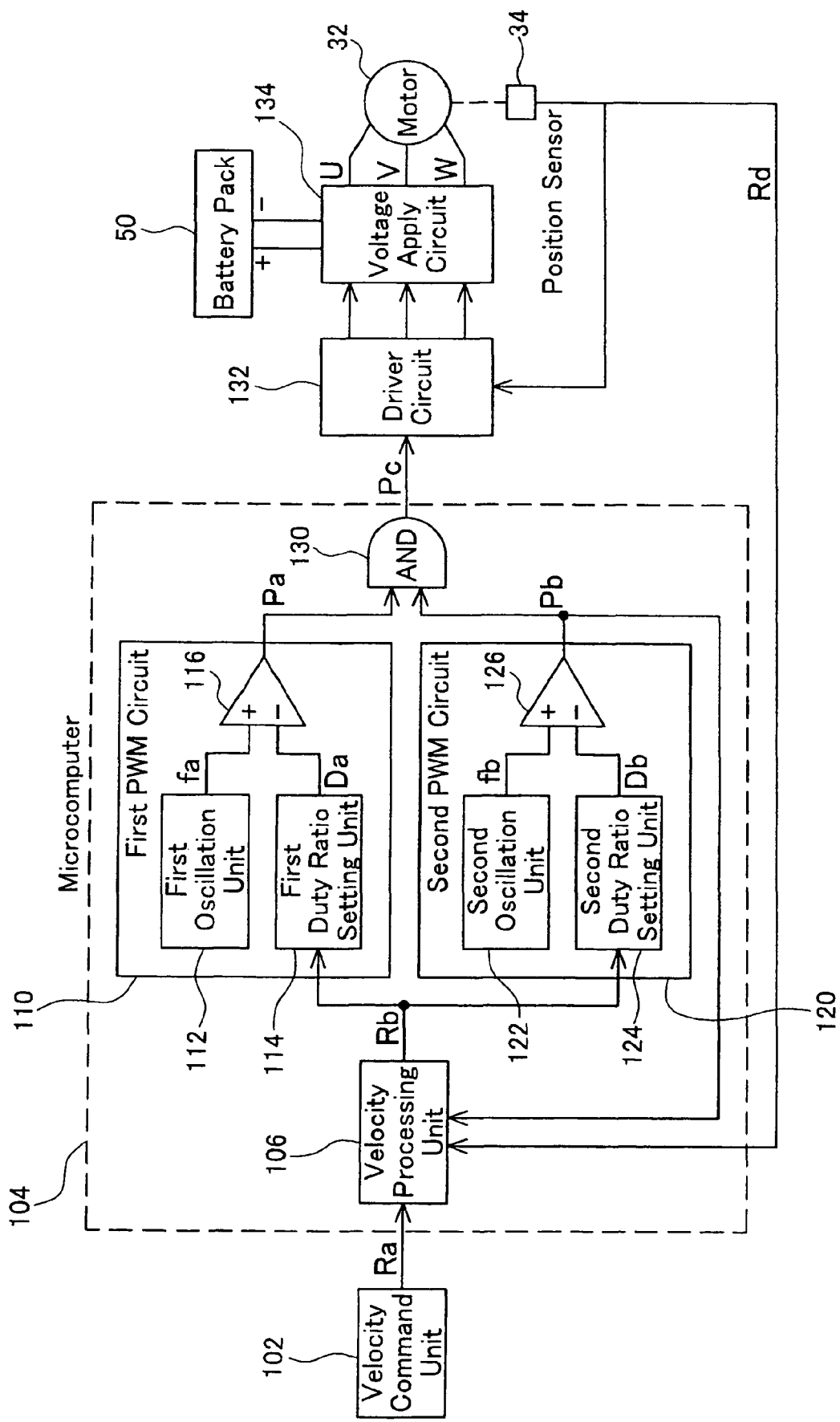
FIG. 2 is a block diagram illustrating the electric configuration of the electric driver.

FIG. 2 is a block diagram illustrating the electric configuration of the electric screwdriver 10. As illustrated in FIG. 2, the electric screwdriver 10 comprises a velocity command unit 102, a velocity processing unit 106, a first pulse width modulating (PWM) circuit 110, a second pulse width modulating (PWM) circuit 120, an AND circuit 130, a driver circuit 132 and a voltage apply circuit 134. The velocity processing unit 106, the first PWM circuit 110, the second PWM circuit 120 and the AND circuit 130 are configured using a microcomputer 104. The microcomputer 104, the driver circuit 132 and the voltage apply circuit 134 are provided in the control board 30.

The velocity command unit 102 is comprised mainly of the trigger switch 28. The velocity command unit 102 determines a target rotation velocity Ra of the motor 32 in accordance with the operation amount acting on the trigger member 28a. The velocity command unit 102 instructs the decided target rotation velocity Ra to the velocity processing unit 106.

The velocity processing unit 106 receives an input of the target rotation velocity Ra from the velocity command unit 102 and outputs an actual rotation velocity Rd of the motor 32 based on of an output signal from the position sensor 34. On the basis of a difference between the target rotation velocity Ra and the actual rotation velocity Rd, the velocity processing unit 106 sets a corrected target rotation velocity Rb obtained by correcting the target rotation velocity Ra. Specifically, the difference (velocity difference) Ra−Rd between the target rotation velocity Ra and the actual rotation velocity Rd is multiplied by a feedback gain G, and the resulting product G·(Ra−Rd) is added to the target rotation velocity Ra to yield the corrected target rotation velocity Rb; the relationship Rb=Ra+G·(Ra−Rd) is thereby given. The corrected target rotation velocity Rb set by the velocity processing unit 106 is inputted into the first PWM circuit 110 and the second PWM circuit 120.

The first PWM circuit 110 comprises a first carrier signal generating unit (first oscillation unit) 112, a first duty ratio setting unit 114 and a first on-signal generating unit 116. The first carrier signal generating unit 112 generates a first carrier signal (sawtooth wave) fa that oscillates at a first carrier frequency. The first carrier frequency is not particularly limited. However, the driver circuit 132 and the voltage apply circuit 134 give rise to an unpleasant noise when the first carrier frequency ranges from 1 kHz to 3 kHz. Accordingly, the first carrier frequency is preferably equal to or lower than 1 kHz or equal to or greater than 3 kHz. In particular, the unpleasant noise can be dramatically suppressed when the first carrier frequency is equal to or lower than 500 Hz or equal to or higher than 5 kHz. In the present embodiment, the first carrier frequency is 10 kHz. Setting the first carrier frequency to be equal to or greater than 10 kHz allows preventing almost completely of the generation of audible noise for humans.

Figure 3:
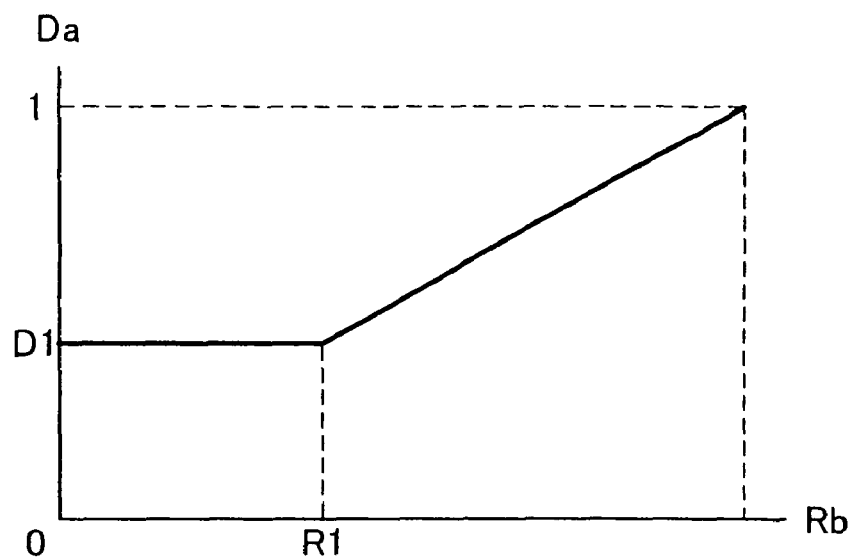
FIG. 3 is a graph illustrating the relationship between a corrected target rotation velocity and a first duty ratio.

The first duty ratio setting unit 114 sets a first duty ratio Da in accordance with the corrected target rotation velocity Rb. FIG. 3 illustrates the first duty ratio Da set by the first duty ratio setting unit 114 in accordance with the corrected target rotation velocity Rb. When the corrected target rotation velocity Rb is less than a threshold velocity R1, the first duty ratio setting unit 114 sets the first duty ratio Da to a predetermined lower limit value D1, as illustrated in FIG. 3. That is, the first duty ratio Da is kept at the lower limit value DI regardless of the corrected target rotation velocity Rb. On the other hand, when the corrected target rotation velocity Rb is equal to or higher than the threshold velocity R1, the first duty ratio setting unit 114 sets the first duty ratio Da to be proportional to the corrected target rotation velocity Rb. Above the lower limit value D1, thus, the first duty ratio Da varies proportionally to the corrected target rotation velocity Rb.

The first on-signal generating unit 116 is comprised mainly of a differential amplifier circuit. The first carrier signal fa and the first duty ratio Da are inputted into the first on-signal generating unit 116, which outputs a digitized signal corresponding to the magnitude relationship between the first carrier signal fa and the first duty ratio Da. Thereby, the first on-signal generating unit 116 can repeatedly output a pulse-like on-signal Pa at the first carrier frequency.

Figure 5:
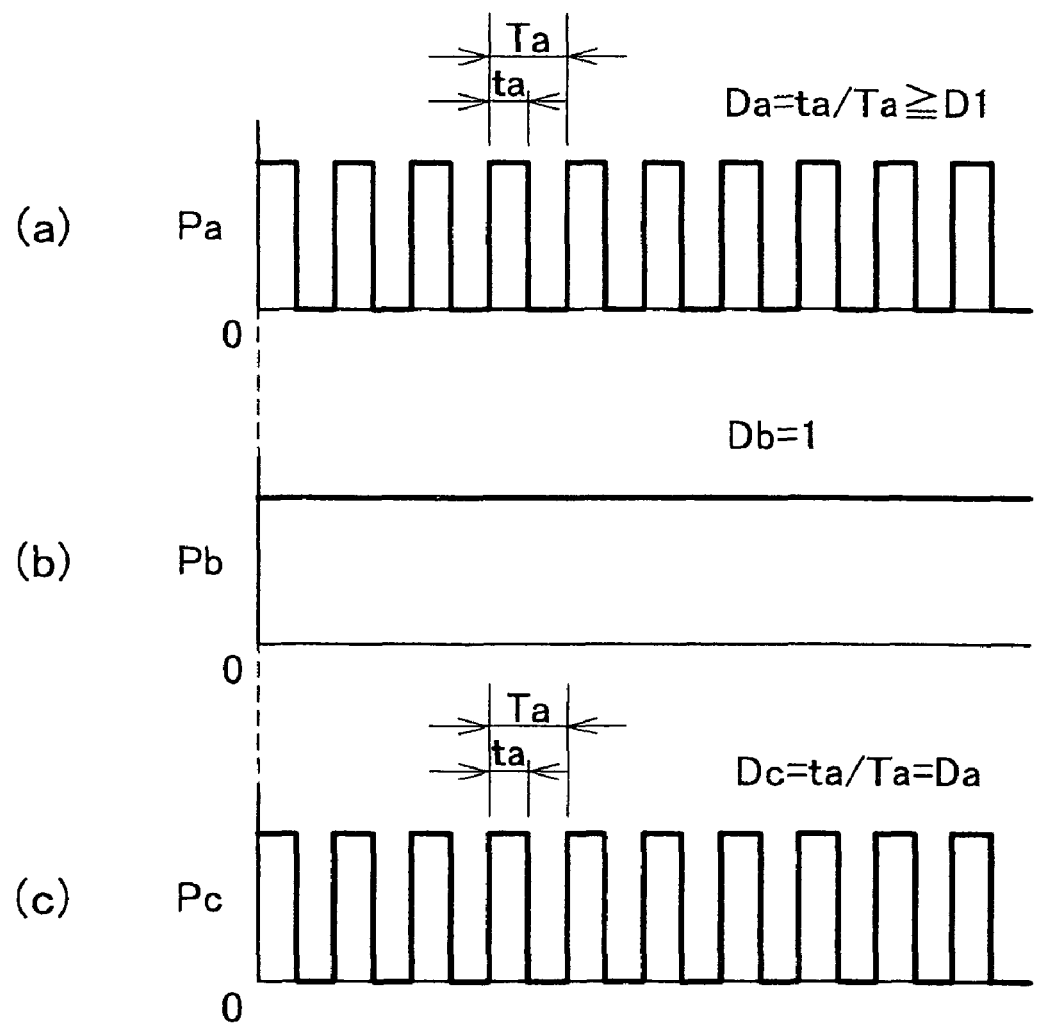
FIG. 5 is a set of diagrams collectively illustrating (a) on-signals Pa outputted by a first PWM circuit, (b) on-signals Pb outputted by a second PWM circuit and (c) on-signals Pc outputted by an AND circuit, when the corrected target rotation velocity is equal to or higher than a threshold value.
Figure 6:
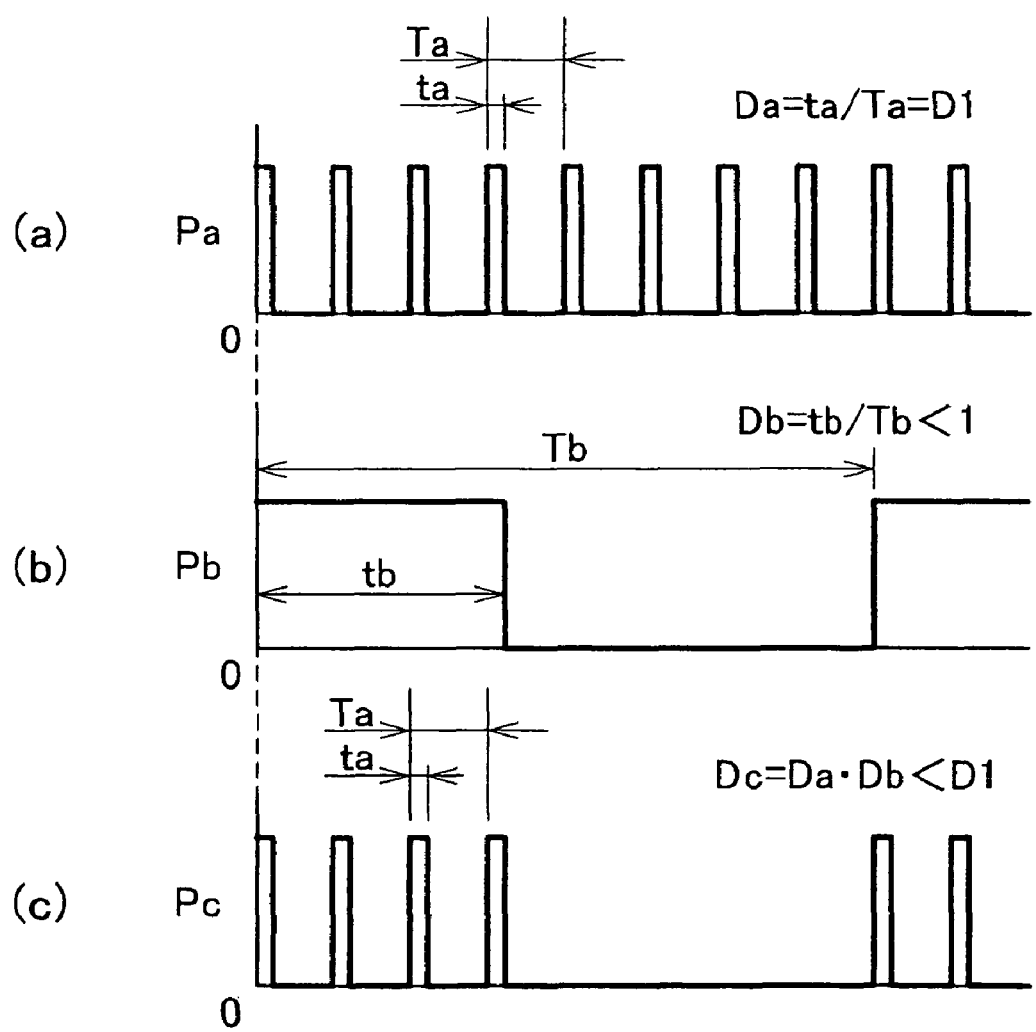
FIG. 6 is a set of diagrams collectively illustrating (a) the on-signals Pa outputted by the first PWM circuit, (b) the on-signals Pb outputted by the second PWM circuit and (c) the on-signals Pc outputted by the AND circuit, when the corrected target rotation velocity is less than the threshold value.

Each of graph (a) in FIG. 5 and graph (b) in FIG. 6 illustrates an example of the on-signals Pa outputted by the first PWM circuit 110. The graph (a) in FIG. 5 illustrates the on-signals Pa when the corrected target rotation velocity Rb is equal to or higher than the threshold velocity R1. The graph (a) in FIG. 6 illustrates the on-signals Pa when the corrected target rotation velocity Rb is less than the threshold velocity R1.

When the corrected target rotation velocity Rb is equal to or higher than the threshold velocity R1, as illustrated in graph (a) in FIG. 5, the first PWM circuit 110 repeatedly outputs a pulse-like on-signal at each first carrier period Ta. The first carrier period Ta is the period corresponding to first carrier frequency and is thus the inverse of the latter. The pulse width of the on-signal Pa outputted by the first PWM circuit 110 (hereafter, simply first pulse width) ta, is the product of the first carrier period Ta and the first duty ratio Da, and varies according to the first duty ratio Da. When the corrected target rotation velocity Rb is equal to or higher than the threshold velocity R1, the first pulse width ta becomes greater as the corrected target rotation velocity Rb increases. When the corrected target rotation velocity Rb is sufficiently large, the first duty ratio Da is set to 1, and hence the first pulse width ta equals the first carrier period Ta. In this case, the first PWM circuit 110 continuously outputs the on-signal.

When the corrected target rotation velocity Rb is less than the threshold velocity R1, as illustrated in graph (a) in FIG. 6, the first PWM circuit 110 repeatedly outputs a pulse-like on-signal at each first carrier period Ta. Herein, the first duty ratio Da is fixed to the lower limit value D1, and hence the first pulse width ta is likewise fixed to a predetermined lower-limit width. The lower-limit width equals the product of the first carrier period Ta and the first duty ratio Da. The first pulse width ta does not thus become excessively small even if the corrected target rotation velocity Rb is very small.

As illustrated in FIG. 2, the second PWM circuit 120 comprises a second carrier signal generating unit (first oscillation unit) 122, a second duty ratio setting unit 124 and a second on-signal generating unit 126. The second carrier signal generating unit 122 generates a second carrier signal (sawtooth wave) fb that oscillates at a second carrier frequency lower than the first carrier frequency. As is the case with the above-described first carrier frequency, the second carrier frequency is not particularly limited. However, the driver circuit 132 and the voltage apply circuit 134 give rise to the unpleasant noise when the second carrier frequency ranges from 1 kHz to 3 kHz. Accordingly, the second carrier frequency is preferably equal to or lower than 1 kHz or equal to or greater than 3 kHz. In particular, the unpleasant noise can be dramatically suppressed when the second carrier frequency is equal to or lower than 500 Hz or equal to or higher than 5 kHz. A sufficient frequency difference can be imparted to the first carrier frequency and the second carrier frequency by setting the first carrier frequency to be equal to or higher than 5 kHz and the second carrier frequency to be equal to or smaller than 500 Hz. In the present embodiment, the second carrier frequency is set to 100 kHz. Setting the second carrier frequency be equal to or lower than 100 Hz allows preventing almost completely of the generation of audible noise for humans.

Figure 4:
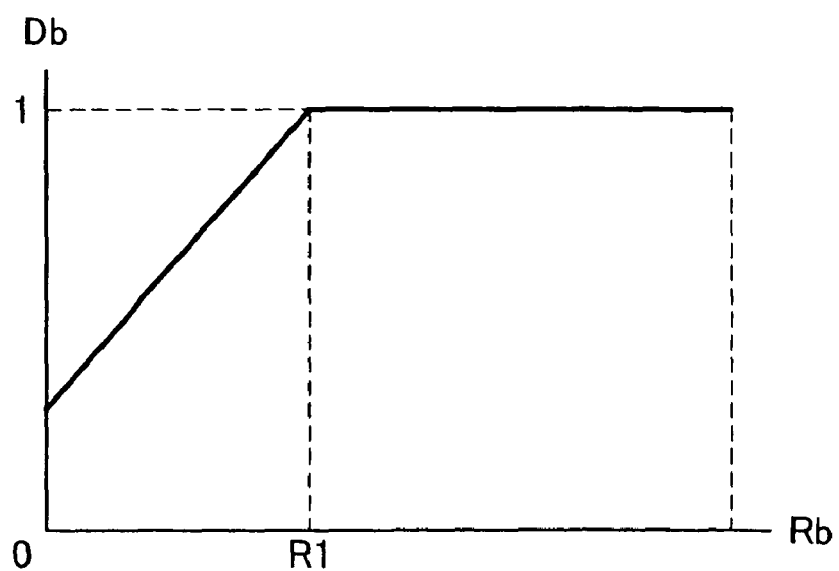
FIG. 4 is a graph illustrating the relationship between the corrected target rotation velocity and a second duty ratio.

The second duty ratio setting unit 124 sets a second duty ratio Db in accordance with the corrected target rotation velocity Rb. FIG. 4 illustrates a second duty ratio Db set by the second duty ratio setting unit 124 in accordance with the corrected target rotation velocity Rb. When the corrected target rotation velocity Rb is equal to or higher than the threshold velocity R1, as illustrated in FIG. 4, the second duty ratio setting unit 124 sets the second duty ratio Db to 1. On the other hand, when the corrected target rotation velocity Rb is less than the threshold velocity R1, the second duty ratio setting unit 124 sets the second duty ratio Db so as to be proportional to the corrected target rotation velocity Rb. That is, the second duty ratio Db varies proportionally to the corrected target rotation velocity Rb while the second duty ratio Db is smaller than 1.

The second on-signal generating unit 126 is comprised mainly of a differential amplifier circuit. The second carrier signal fb and the second duty ratio Db are inputted into the second on-signal generating unit 126, which outputs a digitized signal corresponding to the magnitude relationship between the second carrier signal fb and the second duty ratio Db. Thereby, the second on-signal generating unit 126 can repeatedly output a pulsed on-signal Pb at the second carrier frequency.

Each of graph (b) in FIG. 5 and graph (b) in FIG. 6 illustrates an example of the pulsed on-signals Pb outputted by the second PWM circuit 120. The graph (b) in FIG. 5 illustrates the on-signals Pb when the corrected target rotation velocity Rb is equal to or higher than the threshold velocity R1. The (b) in FIG. 6 illustrates the on-signals Pb when the corrected target rotation velocity Rb is less than the threshold velocity R1.

When the corrected target rotation velocity Rb is equal to or higher than the threshold velocity R1, as illustrated in graph (b) in FIG. 5, the second duty ratio Db is set to 1, and hence the second PWM circuit 120 continuously outputs the on-signal Pb.

When the corrected target rotation velocity Rb is less than the threshold velocity R1, as illustrated in graph (b) in FIG. 6, the second PWM circuit 120 outputs repeatedly a pulse-like on-signal Pb at each second carrier period Tb. The second carrier period Tb is a period corresponding to the second carrier frequency and is thus the inverse of the latter. The pulse width of the on-signal Pb outputted by the second PWM circuit 120 (hereafter referred to simply as second pulse width) tb, is the product of the second carrier period Tb and the second duty ratio Db, and varies according to the second duty ratio Db. When the corrected target rotation velocity Rb is less than the threshold velocity R1, the second pulse width tb becomes smaller as the corrected target rotation velocity Rb decreases. However, the second carrier period Tb is sufficiently longer than the first carrier period Ta, and hence the second pulse width tb is normally sufficiently wider than the first pulse width ta. When the corrected target rotation velocity Rb is very small, however, the second pulse width tb becomes likewise very small, so that the second pulse width tb may have the same pulse width as the first pulse width ta.

As illustrated in FIG. 3, the on-signal Pa outputted by the first PWM circuit 110 and the on-signal Pb outputted by the second PWM circuit 120 are inputted into the AND circuit 130. The AND circuit 130 receives the on-signals Pa, Pb from both PWM circuits 110, 120, and outputs a third on-signal Pc that is the logical product of the received on-signals Pa, Pb. The on-signal Pc outputted by the AND circuit 130 is inputted into the driver circuit 132.

Each of graph (c) in FIG. 5 and graph (c) in FIG. 6 illustrates an example of the on-signals Pc outputted by the AND circuit 130. The graph (c) in FIG. 5 illustrates the on-signals Pc when the corrected target rotation velocity Rb is equal to or higher than the threshold velocity R1. The graph (c) in FIG. 6 illustrates the on-signals Pc when the corrected target rotation velocity Rb is smaller than the threshold velocity R1.

When the corrected target rotation velocity Rb is equal to or higher than the threshold velocity R1, as illustrated in graph (c) in FIG. 5, the on-signals Pc outputted by the AND circuit 130 equals the on-signals Pa outputted by the first PWM circuit 110. That is, when the corrected target rotation velocity Rb is equal to or higher than the threshold velocity R1, the AND circuit 130 repeatedly outputs, for each first carrier period Ta, an on-signal Pc having the first pulse width ta proportional to the corrected target rotation velocity Rb. In this case, duty ratio Dc of the on-signal Pc outputted by the AND circuit 130 equals the first duty ratio Da=ta/Ta.

On the other hand, when the corrected target rotation velocity Rb is less than the threshold velocity R1, as illustrated in graph (c) in FIG. 6, the on-signal Pc outputted by the AND circuit 130 equals the on-signal Pa outputted by the first PWM circuit 110 only during the period in which the second PWM circuit 120 is outputting the on-signals Pb (second pulse widths tb). Herein, the first pulse width ta is constant regardless of the corrected target rotation velocity Rb, while the second pulse width tb varies proportionally to the corrected target rotation velocity Rb. The duty ratio Dc of the on-signal Pc outputted by the AND circuit 130 equals the product Da·Db of the first duty ratio Da and the second duty ratio Db, and is smaller than the lower limit value D1 of the first duty ratio Da. The on-signal Pc of very small duty ratio Dc can be generated while the pulse width of the on-signal Pc is maintained at or above a predetermined lower-limit width.

The on-signal Pc outputted by the AND circuit 130 is inputted into the voltage apply circuit 134 via the driver circuit 132. The voltage apply circuit 134 is a so-called inverter circuit that connects the U, V and W phases of the motor 32 to the positive pole and the negative pole of the battery pack 50 via respective switching elements. The driver circuit 132 decides the switching element that is to conduct on the basis of an output signal from the position sensor 34, and outputs the on-signal Pc from the AND circuit 130 to the switching element. Thereby, the U, V and W phases of the motor 32 are selectively connected to the positive pole or the negative pole of the battery pack 50, and voltage from the battery pack 50 is intermittently applied to the motor 32 in synchronization with the on-signal Pc from the AND circuit 130. The driver circuit 132 and the voltage apply circuit 134 operate herein without generating the unpleasant noise. As explained above, the pulse width of the on-signal Pc outputted by the AND circuit 130 is kept equal to or higher than a pulse width corresponding to the lower limit value D1 of the first duty ratio Da, even when the corrected target rotation velocity Rb is very small. The voltage apply circuit 134, the driver circuit 132 and the AND circuit 130 can easily operate in synchronization with the on-signals Pc outputted by the AND circuit 130.

The motor 32 rotates by way of the power supplied by the battery pack 50. The power supplied to the motor 32 varies in accordance with the duty ratio Dc of the on-signal Pc outputted by the AND circuit 130.

While the motor 32 is rotating, the velocity processing unit 106 timely updates the corrected target rotation velocity Rb on the basis of the difference between the target rotation velocity Ra and the actual rotation velocity Rd. The actual rotation velocity Rd of the motor 32 is feedback-controlled thereby so as to become the target rotation velocity Ra.

Figure 7:
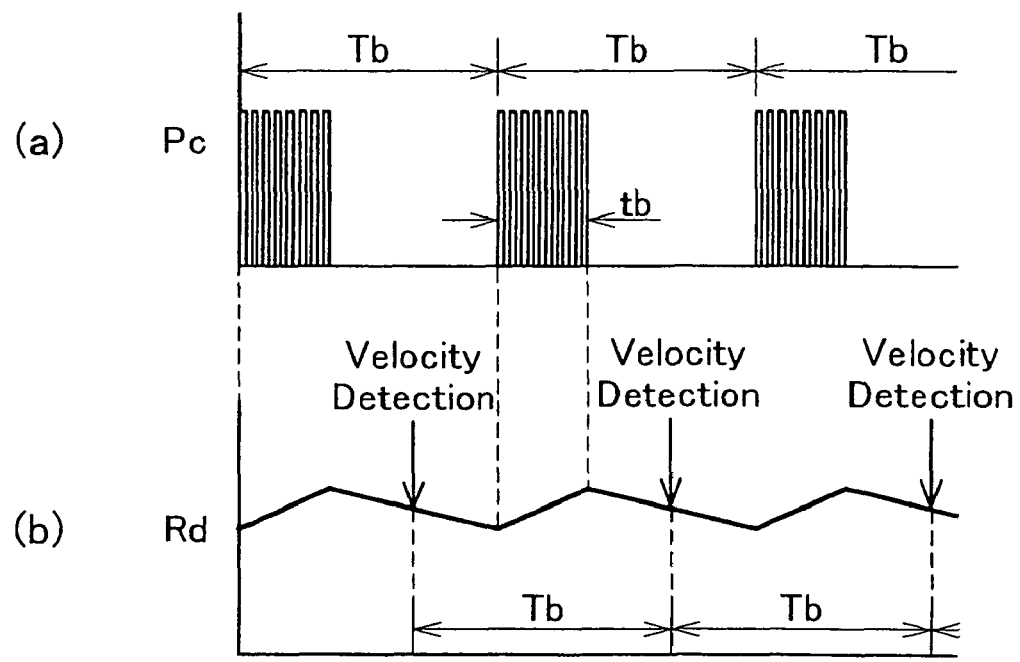
FIG. 7 is a set of diagrams collectively illustrating (a) the on-signals Pc outputted by the AND circuit and (b) an actual rotation velocity Rd of a motor when the corrected target rotation velocity is equal to or higher than the threshold value.

During low-velocity operation when the corrected target rotation velocity Rb is equal to or lower than the threshold velocity R1, however, the actual rotation velocity Rd of the motor 32 pulsates in synchronization with the on-signals Pc outputted by the AND circuit 130, as illustrated in FIG. 7. More specifically, the actual rotation velocity Rd of the motor 32 increases through supply of power from the battery pack 50 to the motor 32 during the period in which the AND circuit 130 outputs the on-signals Pc, i.e. during the period tb in which the second PWM circuit 120 outputs the on-signals Pb. Conversely, no power from the battery pack 50 is supplied to the motor 32 during the period in which the AND circuit 130 does not output the on-signal Pc, i.e. during the period in which the second PWM circuit 120 outputs no on-signal Pb. The actual rotation velocity Rd of the motor 32 drops as a result. The rotation of the motor 32 may also stop when a large load acts on the motor 32.

Therefore, when the corrected target rotation velocity Rb previously calculated is less than the threshold velocity R1, the velocity processing unit 106 detects the actual rotation velocity Rd of the motor 32, taking only the output signal(s) from the position sensor 34 inputted during the period in which the second PWM circuit 120 did not output the on-signal Pb, as the effective value(s). The second PWM circuit 120 sets the next corrected target rotation velocity Rb based thereupon. This allows adjusting the amount of feedback by detecting a rotation velocity that is lower than the average rotation velocity, even when the motor 32 is operating at a low velocity. As a result, the motor 32 can rotate at a stable velocity without stopping.

As illustrated in (b) in FIG. 7, the velocity processing unit 106 synchronizes each of the timings for detecting the actual rotation velocity Rd to the second carrier frequency of the second PWM circuit 120. Specifically, the time interval over which the actual rotation velocity Rd is detected equals the second carrier period Tb. This allows eliminating detection errors that give rise to pulsation of the actual rotation velocity Rd. The motor 32 can thus rotate at a stable velocity, without stopping, even when operating at a low velocity.

Figure 8:
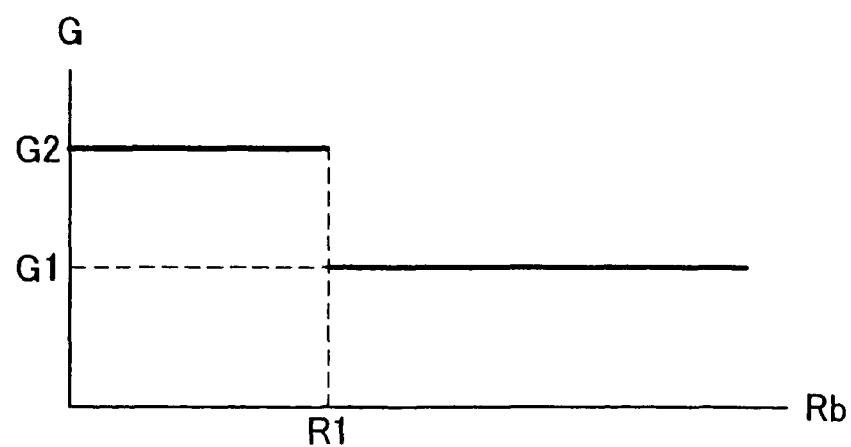
FIG. 8 is a graph illustrating the relationship between the corrected target rotation velocity Rb and a feedback gain G.

The velocity processing unit 106 modifies the feedback gain G, for calculating the corrected target rotation velocity Rb, in accordance with a corrected target rotation velocity Rb that has been calculated previously. When the corrected target rotation velocity Rb calculated previously is equal to or higher than the threshold velocity R1, the velocity processing unit 106 sets the feedback gain G to a predetermined first gain value G1, as illustrated in FIG. 8. On the other hand, when the corrected target rotation velocity Rb calculated previously is less than the threshold velocity R1, the velocity processing unit 106 sets the feedback gain G to a second gain value G2 smaller than the first gain value G1. That is, a greater feedback gain G is used when the second PWM circuit 120 sets the second duty ratio Db to less than 1 and the power supplied from the battery pack 50 to the motor 32 is significantly limited. The motor 32 can rotate as a result at a stable velocity, without stopping, even when operating at a low velocity. The feedback gain G may vary over multiple levels in accordance with the corrected target rotation velocity Rb. Alternatively, the feedback gain G may vary continuously in accordance with the corrected target rotation velocity Rb. In the either case, a larger feedback gain G may be used for a smaller corrected target rotation velocity Rb.

Specific embodiment of the present teachings is described above, but it merely illustrates some possibilities of the teachings and does not restrict the claims thereof. The art set forth in the claims includes variations and modifications of the specific examples set forth above.

The technical elements disclosed in the specification or the drawings may be utilized separately or in all types of combinations, and are not limited to the combinations set forth in the claims at the time of filing of the application. Furthermore, the art disclosed herein may be utilized to simultaneously achieve a plurality of aims or to achieve one of these aims.

The invention claimed is:

1. A motor controller for controlling a rotation velocity of a motor to be at a target rotation velocity, the motor controller comprising:
a velocity processing unit that determines a corrected target rotation velocity by correcting an inputted target rotation velocity of the motor in accordance with a velocity deviation between the inputted target rotation velocity and an actual rotation velocity detected from the motor;
a first PWM circuit that repeatedly outputs an on-signal having a first pulse width at a first carrier frequency, wherein the first carrier frequency is substantially constant regardless of the actual rotation velocity detected from the motor and the first pulse width of the on-signal is modulated by the first PWM circuit in accordance with the corrected target rotation velocity;
a second PWM circuit that repeatedly outputs an on-signal having a second pulse width at a second carrier frequency, wherein the second pulse width is different from the first pulse width, the second carrier frequency is substantially constant regardless of the actual rotation velocity detected from the motor and lower than the first carrier frequency, and the second pulse width of the on-signal is modulated by the second PWM circuit in accordance with the corrected target rotation velocity;
an AND circuit that receives the on-signal outputted from the first PWM circuit and the on-signal outputted from the second PWM circuit and outputs a third on-signal which is a logical product of the on-signals; and
a voltage apply circuit that applies voltage to the motor intermittently in synchronization with the third on-signal outputted from the AND circuit.

2. A motor controller as in claim 1, wherein the velocity processing unit determines the corrected target rotation velocity in accordance with the actual rotation velocity detected during a period in which the second PWM circuit does not output the on-signal.

3. A motor controller as in claim 1, wherein the velocity processing unit determines the corrected target rotation velocity in accordance with the actual rotation velocity detected at a timing synchronized with the second carrier frequency.

4. A motor controller as in claim 1, wherein the velocity processing unit changes an amount of correction to be made to the target rotation velocity with respect to the velocity deviation based on the corrected target rotation velocity that has been determined previously.

5. A motor controller as in claim 1, wherein
the second PWM circuit intermittently outputs the on-signal in which the second pulse width is in proportion to the corrected target rotation velocity in a case where the corrected target rotation velocity is less than a predetermined velocity, and continuously outputs the on-signal in a case where the corrected target rotation velocity is equal to or higher than the predetermined velocity, and
the velocity processing unit increases an amount of correction to be made to the target rotation velocity with respect to the velocity deviation in a case where the corrected target rotation velocity that has been determined previously is less than the predetermined velocity, and decreases the amount of correction to be made to the target rotation velocity with respect to the velocity deviation in a case where the corrected target rotation velocity that has been determined previously is equal to or higher than the predetermined velocity.

6. A motor controller as in claim 1, wherein the second PWM circuit intermittently outputs the on-signal at the second carrier frequency in a case where the corrected target rotation velocity is less than a predetermined velocity, and continuously outputs the on-signal in a case where the corrected target rotation velocity is higher than the predetermined velocity.

* * * * *